United States Patent
Luo et al.

(10) Patent No.: US 10,524,236 B2
(45) Date of Patent: Dec. 31, 2019

(54) UPLINK TRANSMISSION CONTROL WITH CLEAR CHANNEL ASSESSMENT

(71) Applicant: QUALCOMM Incorporated, San Diego, CA (US)

(72) Inventors: Tao Luo, San Diego, CA (US); Aleksandar Damnjanovic, Del Mar, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/064,832

(22) Filed: Mar. 9, 2016

(65) Prior Publication Data

US 2016/0286545 A1 Sep. 29, 2016

Related U.S. Application Data

(60) Provisional application No. 62/137,008, filed on Mar. 23, 2015.

(51) Int. Cl.
*H04W 72/04* (2009.01)
*H04W 74/08* (2009.01)
(Continued)

(52) U.S. Cl.
CPC ....... *H04W 72/0413* (2013.01); *H04W 74/08* (2013.01); *H04W 74/0808* (2013.01); *H04W 76/15* (2018.02); *H04W 16/14* (2013.01)

(58) Field of Classification Search
CPC .......................... H04W 72/0413; H04W 74/08
See application file for complete search history.

(56) References Cited

U.S. PATENT DOCUMENTS

| | | | |
|---|---|---|---|
| 2013/0301611 A1* | 11/2013 | Baghel | H04W 72/04 370/331 |
| 2014/0092855 A1* | 4/2014 | Ahn | H04W 74/0833 370/329 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, Jan. 5, 2015 (Jan. 5, 2015) vol. RAN WG2, No. V12.4.0, pp. 1-251, XP050927457, [retrieved on Jan. 5, 2015].

(Continued)

*Primary Examiner* — Jamal Javaid
*Assistant Examiner* — Thad N Defauw
(74) *Attorney, Agent, or Firm* — Arent Fox, LLP

(57) ABSTRACT

A method, an apparatus, and a computer program product for wireless communication are provided. An eNB transmits pre-grant(s) to a UE(s) for a target resource on a contention-based carrier. In response, the UE(s) perform a CCA/eCCA and, when successful, transmit a preamble to the eNB based on the pre-grant. The eNB detects the preamble(s) and transmits grant confirmation(s) to the UE(s) for which a preamble was detected. The grant confirmation(s) may modify the pre-grant(s). The eNB may overschedule a target resource and based on the received preambles may transmit grant confirmation(s) that instruct a portion of the UEs for which a preamble was received to transmit data on a target resource and may instruct the remaining portion of the UEs for which a preamble was received to cease or modify data transmission.

33 Claims, 14 Drawing Sheets

(51) Int. Cl.
*H04W 76/15* (2018.01)
*H04W 16/14* (2009.01)

(56) References Cited

U.S. PATENT DOCUMENTS

| | | | | |
|---|---|---|---|---|
| 2014/0204843 | A1* | 7/2014 | Larsson | H04L 5/001 |
| | | | | 370/329 |
| 2014/0233528 | A1* | 8/2014 | Webb | H04W 72/04 |
| | | | | 370/330 |
| 2014/0362780 | A1 | 12/2014 | Malladi et al. | |
| 2015/0057011 | A1* | 2/2015 | Di Girolamo | H04W 74/0808 |
| | | | | 455/454 |
| 2016/0007207 | A1* | 1/2016 | Agardh | H04W 74/0816 |
| | | | | 370/329 |
| 2016/0242186 | A1* | 8/2016 | Nissila | H04L 5/001 |
| 2017/0026994 | A1* | 1/2017 | Edlis | H04W 72/1268 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP Standard; 3GPP TS 36.321, 3rd Generation Partnership Project (3GPP), Mobile Competence Centre ; 650, Route Des Lucioles ; F-06921 Sophia-Antipolis Cedex ; France, Dec. 31, 2014 (Dec. 31, 2014), vol. RAN WG2, No. V12.4.0, pp. 1-60, XP050927382, [retrieved on Dec. 31, 2014].
International Search Report and Written Opinion—PCT/US2016/021774—ISA/EPO—dated Jun. 30, 2016.
Taiwan Search Report—TW105107351—TIPO—Aug. 2, 2019.

\* cited by examiner

UPLINK TRANSMISSION CONTROL WITH CLEAR CHANNEL ASSESSMENT

CROSS-REFERENCE TO RELATED APPLICATION

This application claims the benefit of U.S. Provisional Application Ser. No. 62/137,008, entitled "UPLINK TRANSMISSION CONTROL WITH CLEAR CHANNEL ASSESSMENT" and filed on Mar. 23, 2015, which is expressly incorporated by reference herein in its entirety.

BACKGROUND

Field

Aspects of the present disclosure relate generally to wireless communication systems, and more particularly, to uplink transmission control with clear channel assessment in wireless communication networks with contention-based shared frequency spectrum.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A wireless communication system may support operation on multiple cells or carriers, a feature which may be referred to as carrier aggregation (CA) or multi-carrier operation. A carrier may also be referred to as a component carrier (CC), a layer, a channel, etc. The wireless communication system may support operation over a non-contention, licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or a contention-based shared radio frequency spectrum band (e.g., an unlicensed radio frequency spectrum band for which transmitting apparatuses may need to contend for access because the radio frequency spectrum band is available for unlicensed use, such as WiFi use).

One carrier may be a Primary Component Carrier (PCC), which may be a component carrier operating on the licensed radio frequency spectrum. Thus, the PCC may operate without requiring transmitting apparatuses to contend for access because the radio frequency spectrum band is licensed to particular users for particular uses, such as a licensed radio frequency spectrum band usable for LTE/LTE-A communications.

At least one Secondary Component Carrier (SCC) may also be provided. The SCC may operate a contention-based shared radio frequency spectrum band (e.g., an unlicensed radio frequency spectrum band for which transmitting apparatuses may need to contend for access because the radio frequency spectrum band is available for unlicensed use, such as WiFi use). The contention procedure may be an LBT procedure, such as a CCA procedure or extended CCA (eCCA) procedure.

In a CA mode, the SCC may be associated with a PCC. In standalone operation, wireless communication may be performed on the SCC alone, without transmitting or receiving information over the PCC.

Use of a contention based carrier, whether in a standalone mode or in a CA mode may involve wasting resources and inefficient scheduling of UEs. This inefficiency is caused by reserving resources for UEs that do not pass CCA and allow the reserved resources to go unused.

For example, upon receiving an UL grant for the SCC, the UE must perform a CCA/eCCA in order to transmit data. UEs might not pass the CCA/eCCA, leading to a waste of resources intended for the UE. One solution to this problem is for an eNB to assign multiple UEs for the same resource, understanding that some portion of the UEs will likely fail the CCA/eCCA, and another portion of the UEs may pass CCA/eCCA. However, this can lead to multiple UEs transmitting on overlapping resources.

In order to avoid wasting resources, an eNB may pre-assign a resource to a UE prior to CCA/eCCA. Once the eNB receives confirmation that the UE passed CCA/eCCA, the eNB sends a grant confirmation to the UE. The grant confirmation may adjust the pre-assigned resource, such that the eNB can pre-assign resources to multiple UEs and then grant the resources after confirming which UEs are able to use the resources. This also allows the eNB to avoid granting resources to UEs that do not pass CCA/eCCA and at the same time allows the eNB to avoid granting overlapping resources to UEs that both are capable of passing the CCA/eCCA.

In an aspect of the disclosure, a method, a computer program product, and an apparatus are provided. The apparatus receives a pre-grant assignment at a UE, performs a clear channel assessment (CCA) operation on a secondary component carrier (SCC) based on the pre-grant assignment, transmits a preamble on the SCC based on the pre-grant assignment when the CCA operation succeeds, the preamble uniquely identifying the UE, receives a grant confirmation in response to the preamble transmission.

In another aspect of the disclosure, a method, a computer program product, and an apparatus are provided. The apparatus transmits one or more pre-grant assignments to a set of UEs, the set including one or more UE. The apparatus detects one or more preamble transmissions on a contention based carrier in response to the transmission of the one or more pre-grant assignments and transmits one or more grant confirmation assignments in response to the detected one or more preamble transmissions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
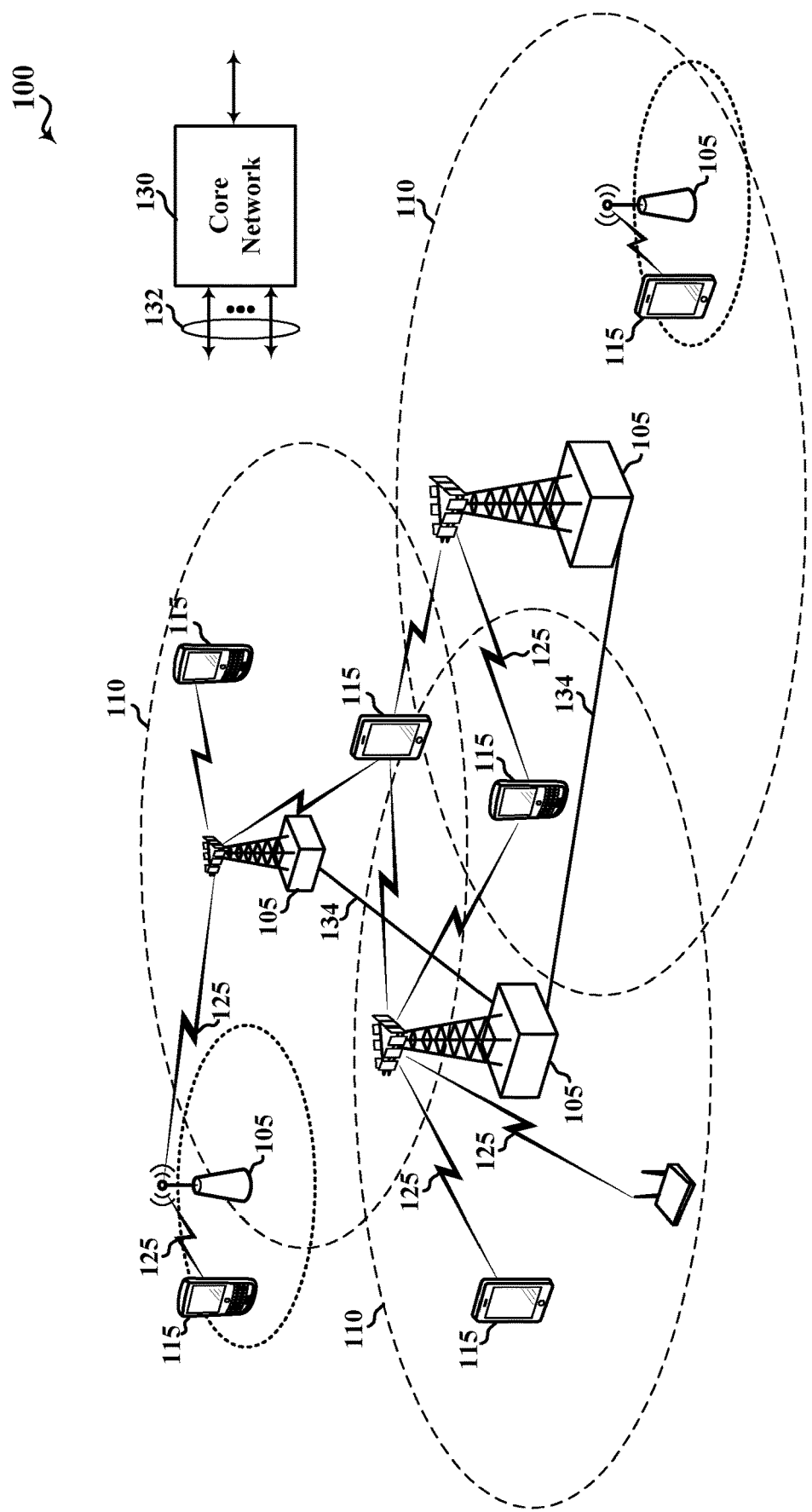
FIG. 1 shows a diagram that illustrates an example of a wireless communications system according to various embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure (eCCA)) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., Si, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
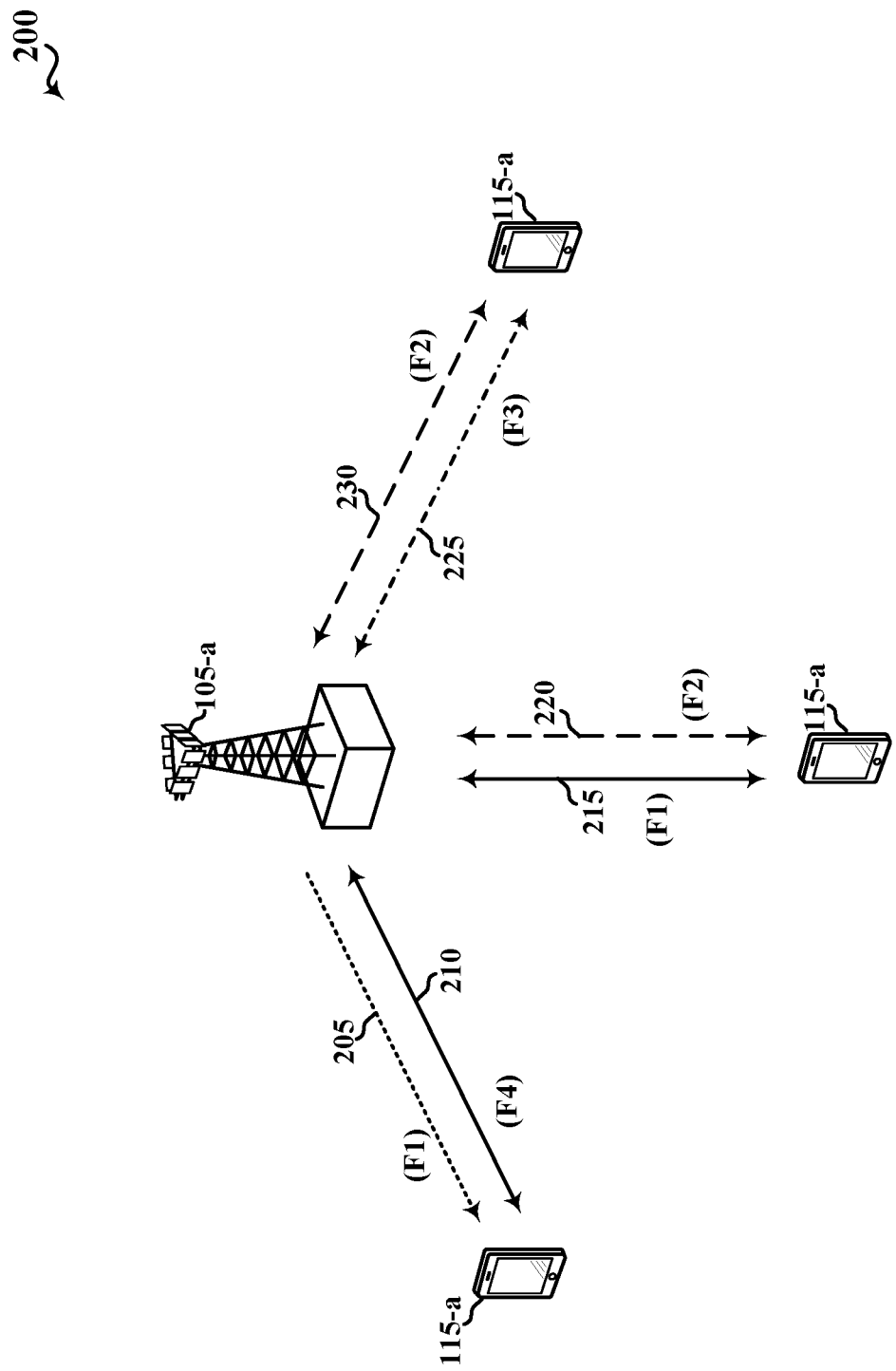
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode (e.g., LAA mode) in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator (MNO)) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE PCC on the non-contention spectrum and the LTE SCC on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) CCA and/or a grab-and-relinquish mechanism aligned to a radio frame boundary.

In the CA mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
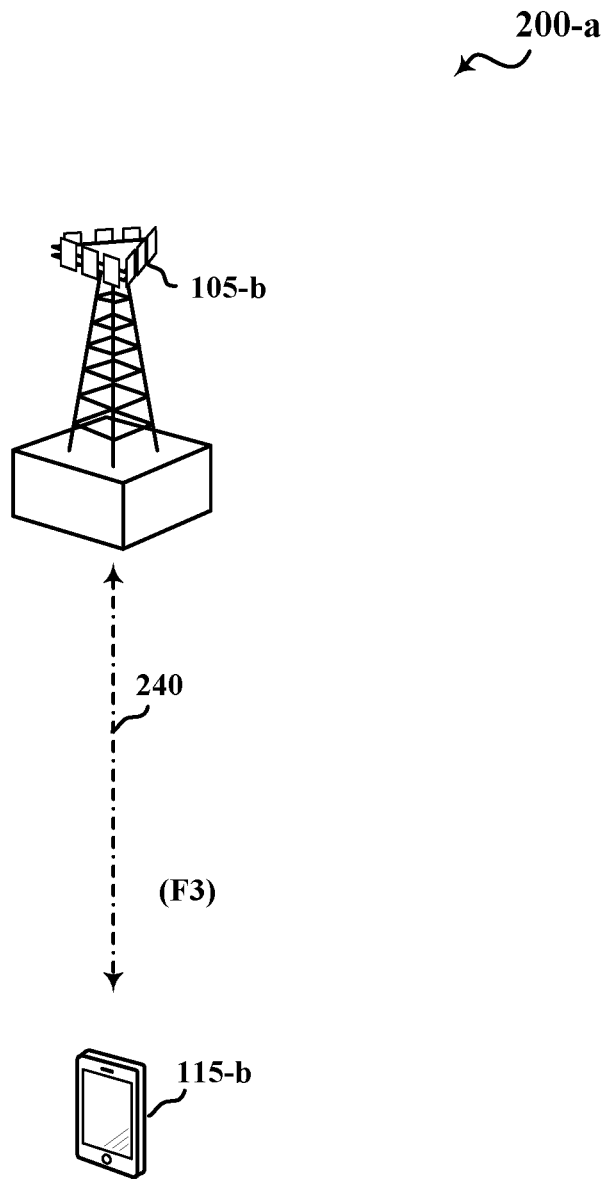
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A extended to contention-based shared spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105, 205, or 205-a described with reference to FIG. 1, 2A, or 2B, or one of the UEs 115, 215, 215-a, 215-b, or 215-c described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
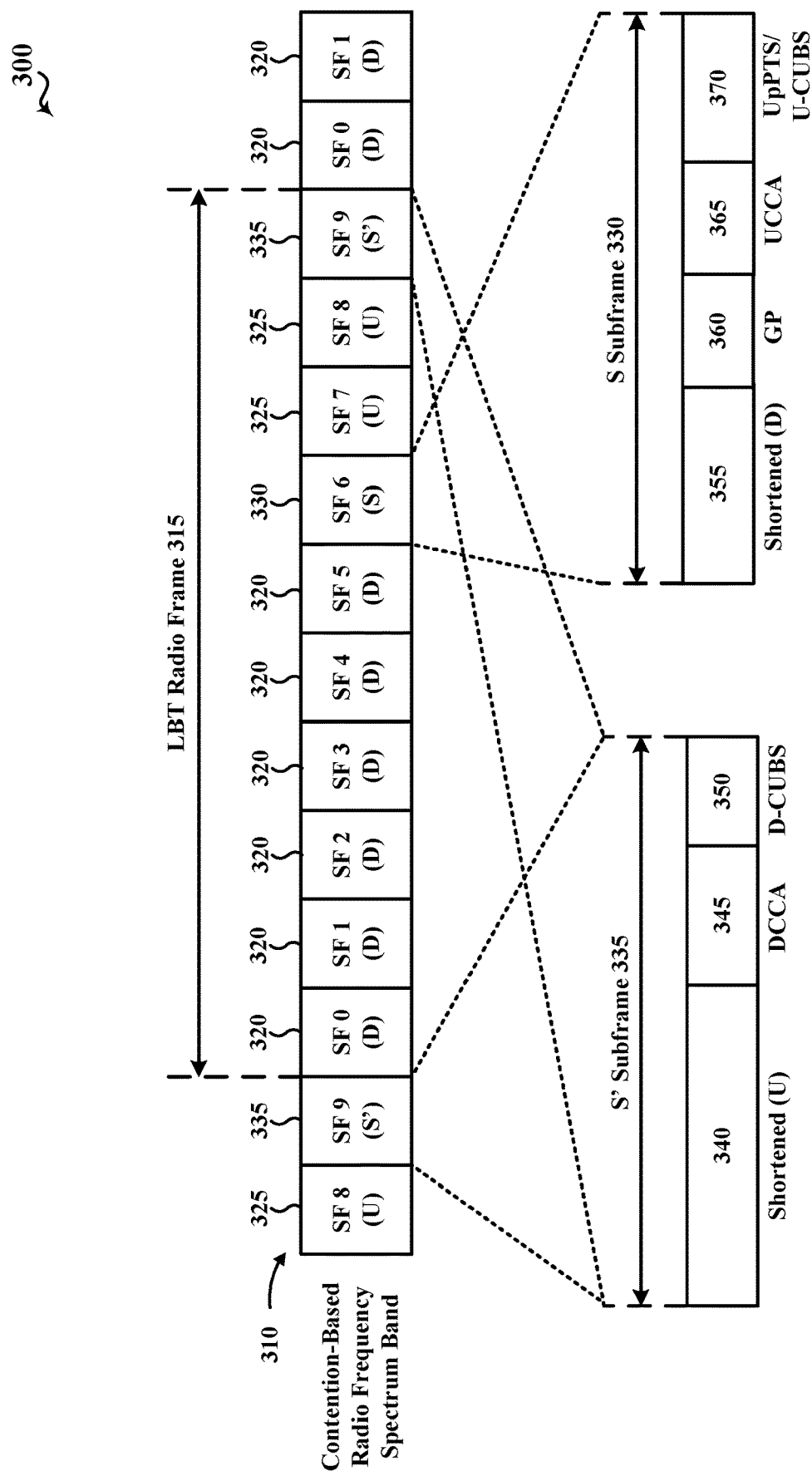
FIG. 3 shows a diagram that illustrates an example of carrier aggregation when using LTE concurrently in licensed and unlicensed spectrum according to various embodiments.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
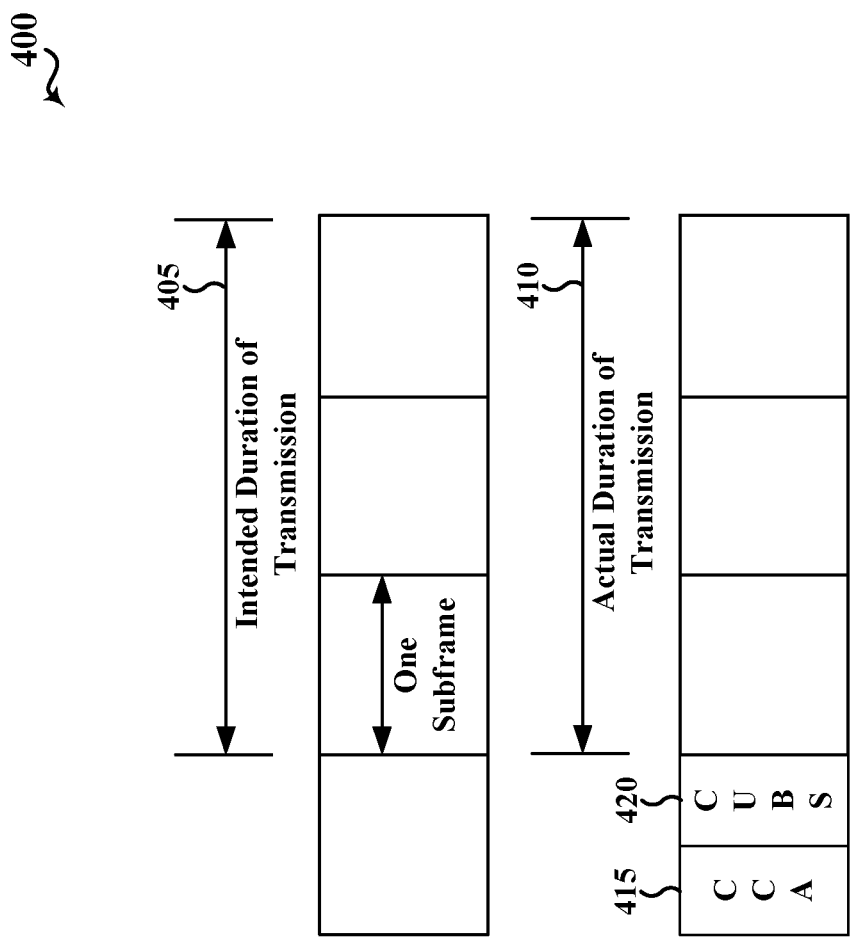
FIG. 4 is an illustration of a CCA procedure performed by a transmitting apparatus when contending for access to a contention-based shared radio frequency spectrum band, in accordance with aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
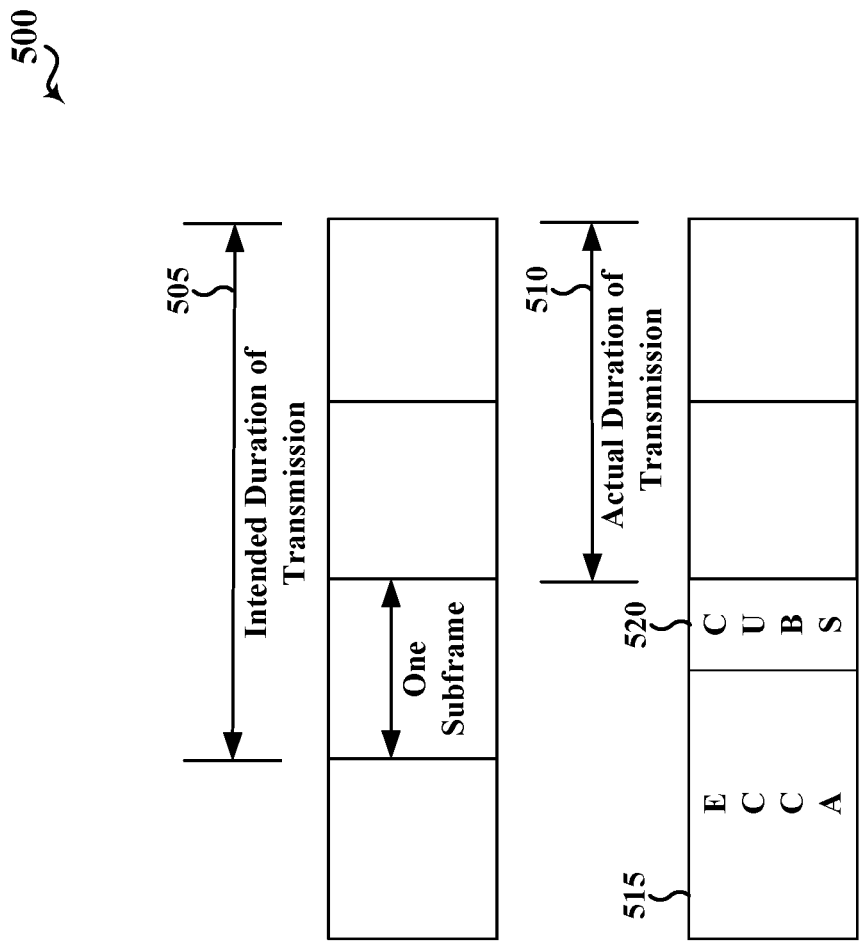
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (eCCA) procedure 515 performed by a transmitting apparatus when contending for access to a contention-based shared radio frequency spectrum band, in accordance with various aspects of the present disclosure. In some examples, the eCCA procedure 515 may be an example of the downlink CCA procedure 345 or uplink CCA procedure 365 described with reference to FIG. 3. The eCCA procedure 515 may include a random number of CCA procedures, and in some examples may include a plurality of CCA procedures. The eCCA procedure 515 may, therefore, have a variable duration. In some examples, the eCCA procedure 515 may be performed in accordance with an LBT-load based equipment (LBT-LBE) protocol (e.g., the LBT-LBE protocol described by EN 301 893). The eCCA procedure 515 may provide a greater likelihood of winning contention to access the contention-based shared radio frequency spectrum band, but at a potential cost of a shorter data transmission. Following the eCCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
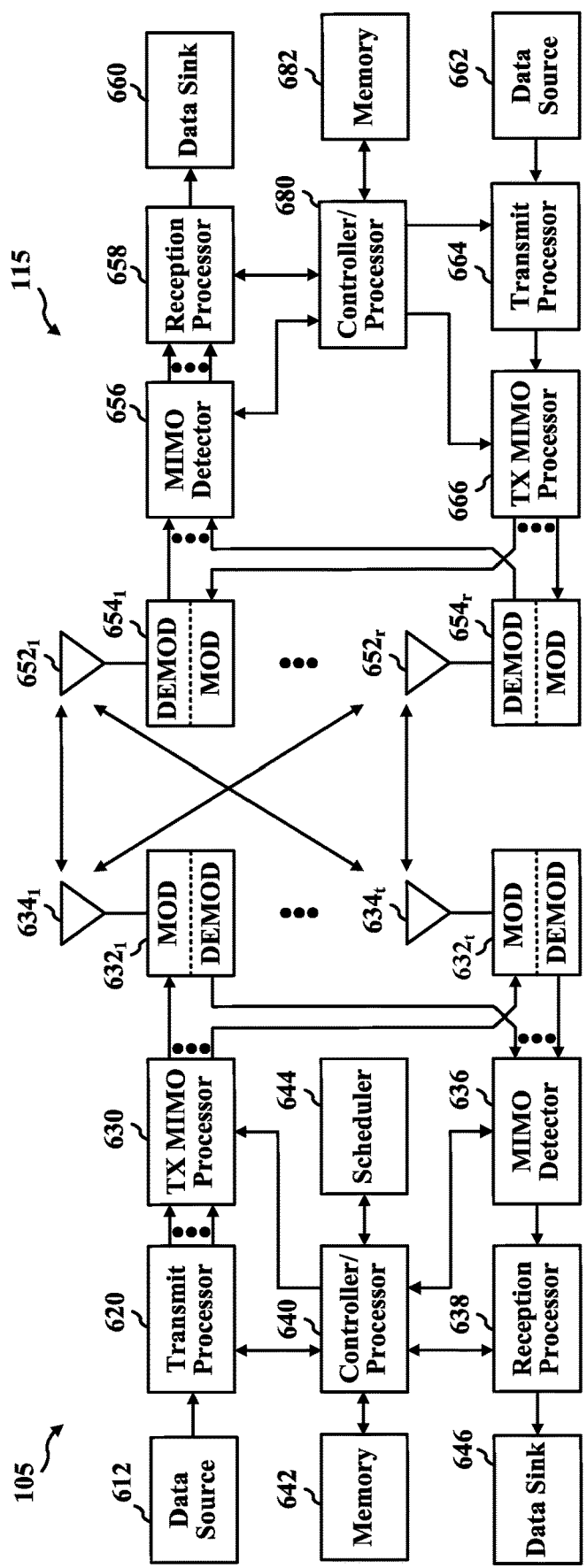
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and components at the eNB 105 may perform or direct the execution of various processes for the techniques described herein. The controllers/processor 680 and/or other processors and components at the UE 115 may also perform or direct the execution of the functional blocks illustrated in FIGS. 8, 10A, 10B, and 12, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

A wireless communication system may support operation over a non-contention, licensed radio frequency spectrum band and/or a contention-based shared radio frequency spectrum band. The wireless communication system may operate using multiple carriers, e.g., using CA. One carrier may be a Primary Component Carrier (PCC), which may be a component carrier operating on the licensed radio frequency spectrum. Thus, the PCC may operate without requiring transmitting apparatuses to contend for access because the radio frequency spectrum band is licensed to particular users for particular uses, such as a licensed radio frequency spectrum band usable for LTE/LTE-A communications.

At least one Secondary Component Carrier (SCC) may also be used for wireless communication. The SCC may operate a contention-based shared radio frequency spectrum band (e.g., an unlicensed radio frequency spectrum band for which transmitting apparatuses may need to contend for access because the radio frequency spectrum band is available for unlicensed use, such as WiFi use).

In CA, the SCC may be associated with a PCC. In standalone operation, wireless communication may be performed on the SCC alone, without transmitting or receiving information over the PCC.

Use of a contention based carrier, whether in a standalone mode or in a CA mode may involve wasting resources and inefficient scheduling of UEs. Upon receiving an UL grant for resources on the SCC, the UE must perform a CCA/eCCA in order to transmit data. UEs might not pass the CCA/eCCA, leading to a waste of resources intended for the UE, since those resource were dedicated for use by a specific UE. While the eNB may assign multiple UEs for the same resource, understanding that a percentage of UEs will likely fail the CCA/eCCA, if multiple UEs pass CCA/eCCA, this can lead to multiple UEs transmitting on overlapping resources.

As illustrated in connection with FIGS. 4 and 5, LTE-U uplink in CA mode includes the series of steps where: (1) first, an eNB sends an uplink grant to a UE, (2) upon receiving the UL grant, the UE decodes the grant and performs/continues to perform CCA/eCCA operation, and (3) when the CCA/eCCA operation succeeds, the UE starts to transmit data. The eNB may assign different resource blocks (RBs) to different UEs for uplink transmission in one subframe. If a UE fails CCA/eCCA operation before a predefined boundary, such as at a resync, its grant expires for that subframe associated with the predefined boundary. A resync may occur periodically in order to allow base stations and UEs to synchronize for concurrently transmitting on the contention-based shared spectrum of LTE frame.

The eNB may assign the same RBs to multiple UEs for uplink transmission in one subframe. If more than one UE succeeds CCA/eCCA before a predefined boundary, such as the resync, they will each transmit using overlapping resources. Although the eNB may employ a multiple-user multiple-input multiple-output (MU-MIMO) receiver to separate UEs sharing the same resource, this may complicate eNB receivers and may require limiting data rates for each of the transmitting UEs.

This presents a potential waste of resources. In one example, an eNB may assign an RB to a single UE, for example, using an FDM grant. At times the eNB may assign an RB to a UE that thereafter fails the CCA/eCCA operation and is unable to transmit data in the assigned RB. Conversely, resources may be allocated inefficiently when the eNB assigns overlapping resources to multiple UEs and selects the data rates assuming all UEs will transmit, because only a subset of UEs may succeed in their CCA/eCCA operation. Therefore, the UEs that do proceed to transmit data on the assigned RB may backoff unnecessarily and/or transmit using reduced data rates, in order to ensure that the eNB can receive the multiple overlapping signals when multiple UEs do succeed. This may occur because the eNB does not know ahead of time which UE will succeed CCA/eCCA for a given subframe.

Figure 7:
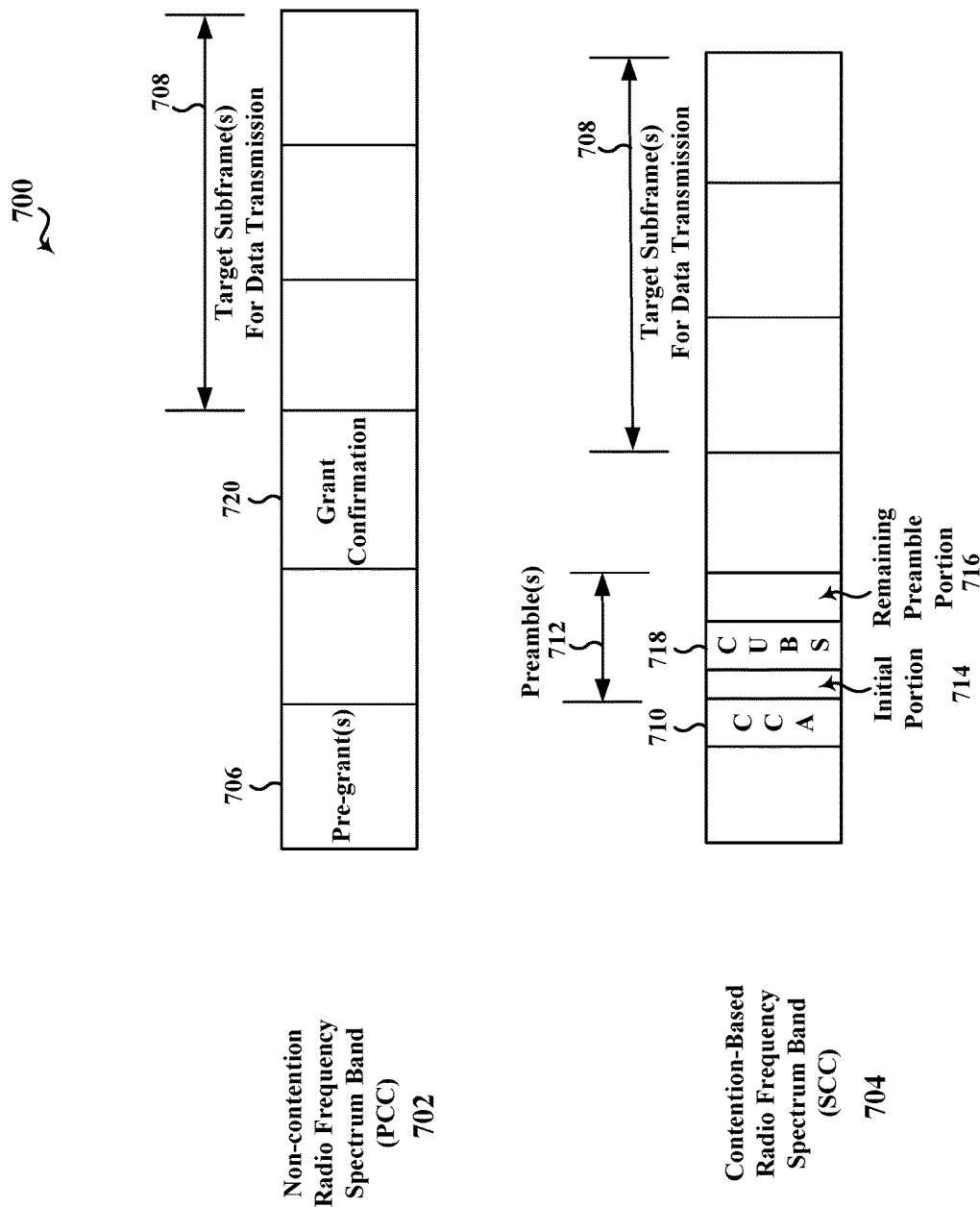
FIG. 7 is a block diagram illustrating a pre-grant and a preamble transmission in accordance with various aspects of the present disclosure.

In order to avoid wasting resources, as presented herein, an eNB may pre-assign the same RB to multiple UEs. The assigned RB may be for a contention-based carrier, such as an SCC using an unlicensed spectrum. Thus, the eNB may over provision the target resource by transmitting a pre-assignment for the same RB for an uplink grant to multiple UEs. This assignment is also referred to herein as a "pre-grant" or a "pre-assignment." The pre-grant assignment may be made in order to allow the eNB to limit which UEs will be eligible receive a confirmed grant of resources for actual data transmission. The pre-grant assignment may instruct the UE to transmit a preamble to the eNB rather than to begin transmission of data. The pre-grant may be transmitted by the eNB on a non-contention based carrier such as a PCC (which may operate on a licensed spectrum). However, the PCC may operate on an unlicensed carrier, as well. FIG. 7 illustrates a diagram 700 of non-contention radio frequency spectrum band 702, such as a PCC, and a contention-based radio frequency spectrum band 704, such as an SCC.

The pre-grant(s) 706 may be transmitted by the eNB to at least one UE on the non-contention carrier 702. The pre-grant may indicate pre-assigned target subframe(s) 708 on a contention-based carrier for the UE(s) to perform data transmission.

Although the example in FIG. 7 illustrates the pre-grant and grant confirmation being transmitted on the PCC, in another example, at least one of the pre-grant and the grant confirmation may be transmitted on the SCC.

Upon receiving the pre-grant, each UE may perform a CCA/eCCA operation 710 and transmit a preamble 712 when it succeeds in the CCA/eCCA operation. The pre-grant assignment may assign resources, e.g., target subframe(s) 708, on the contention based carrier 704. One example of a contention based carrier is an SCC operating on an unlicensed spectrum. Thus, the UE may perform CCA/eCCA 710 for the SCC indicated in the pre-grant assignment and may transmit the preamble 712 on this SCC 704 once the CCA/eCCA succeeds. The preamble 712 may be transmitted during a time indicated by the pre-grant, and before the subframe(s) 708 scheduled in the pre-grant for UL data transmission. Thus, the resource assigned for transmission of the preamble and pre-assigned for transmission of later UL data may be different.

Although FIG. 7 only illustrates a single preamble, the UE may continue to transmit the preamble 712 until it receives a response from the eNB, such as signaling in PCC, or until the end of a designated time. For example, if the UE does not receive a response from the eNB, the UE may continue to transmit the preamble until a timer expires or until the end of a time period or a boundary is reached, such as the resync. The pre-grant may include timing information that indicates when the UE should begin to transmit the preamble and may indicate a frequency at which the UE should transmit the preamble. The pre-grant may also include timing information that indicates when the UE should cease transmitting the preamble, even if it has not received a response from the eNB to the preamble.

The preamble may be unique for each UE scheduled on the same uplink resource, e.g., subframe(s), so that the eNB can identify the UE that is the source of the preamble. The preamble may include multiple portions. For example, an initial portion 714 of the preamble may be configured to identify the UE to the eNB so that the eNB may determine which of the UEs, to which a pre-grant assignment was issued, passed the CCA/eCCA check. The preamble signature may be a function of the pre-grant received by each UE. Thus, the preamble may be matched to the pre-grant.

The remainder of the preamble 716 may be configured to maintain the channel used for the preamble transmission. For example, as illustrated in FIG. 7, the UE may transmit one or more channel reserving signals 718 (e.g., one or more CUBS) over the contention-based frequency spectrum band as a part of the preamble. The preamble may comprise a TDM or FDM waveform so that multiple transmissions may be detected by the eNB. For example, the preamble may be configured so that multiple preambles can be interlaced with each other. The pre-grant may indicate the interlace that should be used by the UE for the preamble. The preamble needs to be detectable by the eNB and in one example, the preamble may need to comprise enough power to occupy the channel intended for communication. By occupying the channel, e.g., in frequency and time, with the preamble, the UE can then use the same channel for its data transmission. For example, the UE may need to occupy 4 of every 12 tones for the channel.

The preamble may also comprise additional information. Among others, such additional information may comprise, among others, a buffer size (SR) or QoS requirement information for the UL traffic. This additional information may be selected to provide the eNB with more accurate/recent information to assist the UL scheduler. Such additional information may be used by the eNB in order to make more accurate or more efficient grant confirmations. For example, the eNB may prioritize UEs based on buffer size.

The remainder 716 of the preamble may comprise the WiFi preamble in order to notify WiFi nodes regarding the duration of the transmission so that the WiFi nodes can back off or adjust their transmissions accordingly. Providing the information needed by the eNB at the initial portion of the preamble 712 allows the eNB to decode the initial portion to identify the UE and make determinations regarding grant confirmation while the preamble is continuing to transmit the remaining portion.

The preamble 712 in FIG. 7 is not necessarily drawn to scale. Although FIG. 7 illustrates the preamble 712 as approximately spanning a subframe, the preamble may be transmitted within a single subframe, spanning multiple subframes, or spanning only a sub-subframe duration (e.g., one of more symbols). The pre-grant and the preamble may be transmitted within a few symbols (e.g., 0 or more) of each other. The eNB may specify in the pre-grant assignment the duration during which the preamble transmission should occur. This allows the UE to stop the preamble transmission at the designated time, when no grant-confirmation is received from the eNB. For example, the pre-grant may include a time limit after which preamble transmission should cease if no response is received. This allows the duration of preamble transmission to be adjusted based on link budget limitations of particular UEs. For example, UEs with link budget limitations may be scheduled to transmit the preamble within a narrower bandwidth but longer time period.

After sending the pre-grants to a UE, the eNB attempts to decode at least the initial portion 714 of a preamble 712 from the UE. For example, the eNB may attempt to detect a preamble transmitted by the UE in the corresponding SCC. The remaining portion 716 of the preamble—after the initial portion 714—identifying the UE may provide time for the eNB to process the preamble and to determine an actual grant of resources for data transmission in response to receiving the preamble.

Upon receipt of the preamble, the eNB transmits a grant confirmation 720 assignment to the UE for which the eNB detects a preamble. The grant confirmation 720 assignment may comprise, e.g., a signal/control channel assignment for data transmission. As illustrated, the grant confirmation assignment may be sent on a non-contention based carrier, such as a PCC 702. Similar to the pre-grant and the preamble, the preamble and the grant confirmation may be sent within a few symbols (e.g., 0 or more) of each other.

The eNB may send pre-grant assignments to multiple UEs for the same resource, and therefore, the eNB might receive more than one preamble in response to the pre-grants. Thus, the preambles may overlap each other in time and frequency, although the preambles may be grouped in an FDM manner. Additionally, as the UE may continue to transmit the preamble until it receives the grant confirmation, the UE may be transmitting on the contention based carrier at the same time that it receives the grant confirmation on the non-contention carrier.

The eNB may use the received preamble transmission in order to perform another round of channel estimation. This allows the eNB to make grant confirmations based on a more recent look of the channel to improve the MCS computation accuracy.

In one example, the eNB may transmit multiple pre-grants to a single UE, e.g., each pre-grant having a different MCS or resource assignment. The UE then performs CCA/eCCA based on each of the grants. When the CCA/eCCA is successful, the UE transmits a preamble based on the pre-grants. As noted above, the preamble may be a function of the pre-grant so that the eNB is able to match the preamble to a corresponding pre-grant, even for the same UE. Then, in the grant confirmation, the eNB may select one of the pre-grant assignments to confirm for data transmission. This allows the eNB to make accurate determinations for a particular UE immediately before granting resources (within the same subframe or a subsequent subframe).

The grant confirmation 720 may modify the pre-grant assignment for the UEs whose preamble was detected by the eNB.

The grant confirmation 720 may stop the transmission of some UEs, e.g., when the eNB wants to avoid uplink collision. For example, when multiple preambles are received from different UEs in response to pre-grant assignments for the same resource, grant confirmation signaling may indicate which UE may continue to transmit data and may indicate that the other UEs should stop the preamble transmission.

When a UE receives a grant confirmation 720 indicating that it should continue transmission, the selected UE may switch from transmitting the preamble in order to transmit data. Conversely, when the UE receives, in response to its preamble transmission, a response from the eNB that it should discontinue transmission, the UE will stop transmission.

The grant confirmation 720 may also modify the pre-grant sent to the UE earlier. As the eNB better understands the resource allocation at this point, because the eNB knows which UEs passed the CCA/eCCA check.

When multiple preambles are received by the eNB for a single resource allocation, the eNB may select the UE for which continued transmission will be indicated in the grant confirmation using fairness criteria. For example, a fairness comparison may be made between UEs for which a preamble is received. Priority levels of the data for transmission at the different UEs may be taken into consideration before a UE is selected for continued transmission.

Thus, the eNB may over-schedule a particular resource by sending pre-grant 706 assignments to multiple UEs for the same resource or by sending multiple pre-grants for different resources to a single UE. The eNB may then consider a preamble indicating that CCA/eCCA was successful before confirming a grant to resources for data transmission.

In one example, it may be beneficial to have a short preamble transmission time. If the UE is not selected for continued transmission in the grant confirmation, the preamble transmission is wasted for that particular UE.

Preamble transmission time may be reduced by having the first portion of the preamble be used by the eNB to detect the UE. The length of this portion of the preamble may be associated with the link budget of the UE being scheduled. The remainder of the preamble may be configured for band occupation and might be less useful to the eNB. The transmission of the remaining portion of the preamble may be directed to other nodes than the eNB. For example, the remainder of the preamble may comprise communication directed to WiFi nodes, e.g., using a WiFi preamble. By having the initial portion of the preamble directed to the eNB, allows time for the eNB to decode the preamble and determine the grant confirmation that it will send in response to the preamble.

Preamble transmission time may be reduced through the implementation of fast preamble detection.

Preamble transmission time may be reduced through the use of a fast control channel. Such a fast control channel may be in a different component carrier than the SCC, such as PCC. Preamble transmission time can be reduced by having the control channel be available frequently and with a short duration. In one example, an LTE system may be modified to add a fast control channel which may be used as the PCC. The fast control channel itself may span one symbol or multiple symbols. The control channel may be based on a sub-symbol transmission. The fast control channel may include transmissions at flexible locations within a subframe, instead of being limited to the beginning of a subframe.

Preamble transmission time may be reduced through fast and easy control channel decoding. For example, the preamble transmission may be stopped when a fast control channel is received and decoded. Reduced processing time to decode the control channel may be achieved through the use of a more simple code for the fast control channel.

As one example, for a fast control channel, a PCFICH or PHICH like control signal may be transmitted in one or more OFDM symbols (or a fraction of a symbol) in data region where a few RBs are reserved for this purpose.

Figure 8:
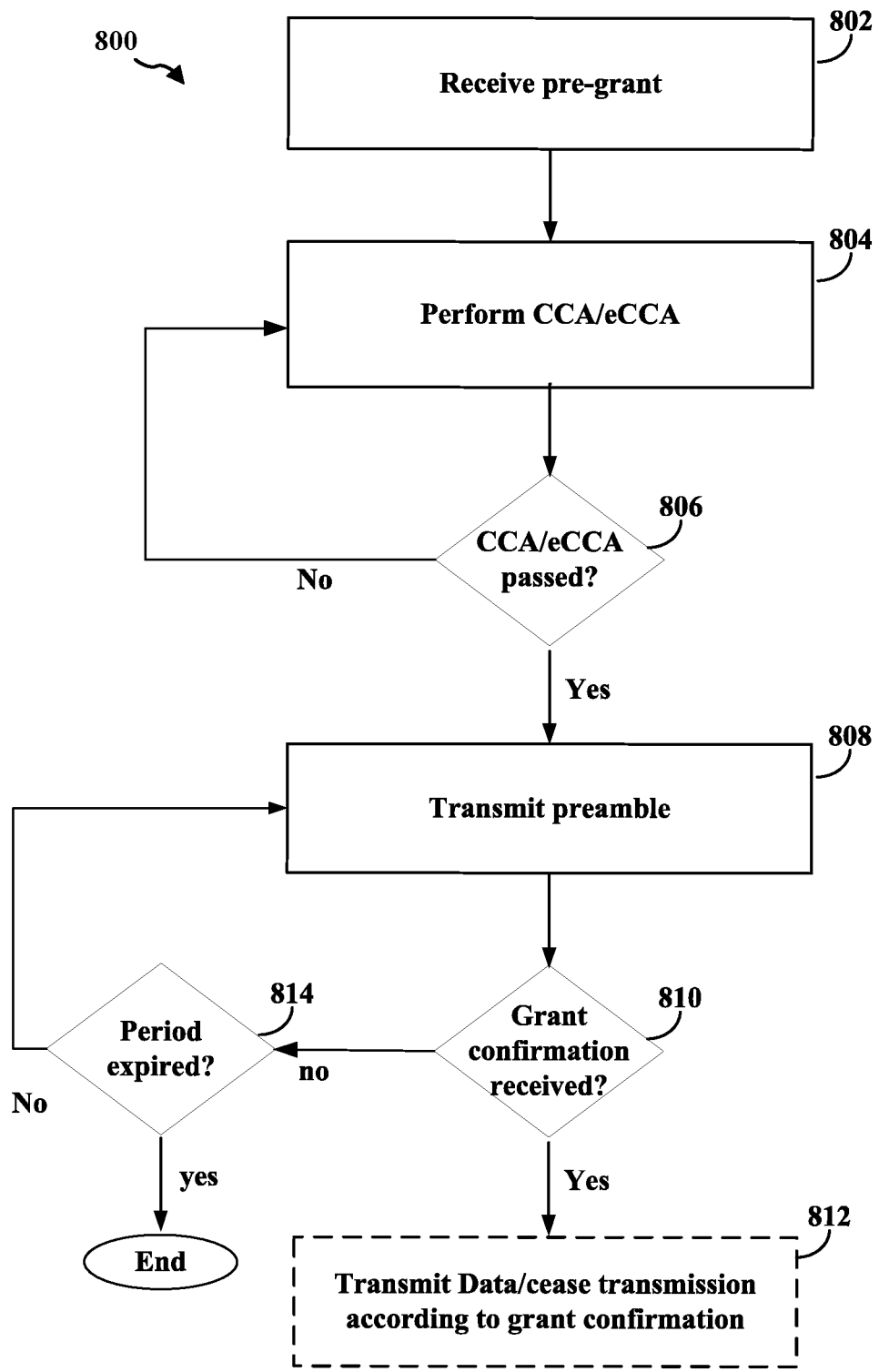
FIG. 8 is a flow chart of a method of wireless communication in accordance with various aspects of the present disclosure.

FIG. 8 is a flow chart 800 of a method of wireless communication. The method may be performed by a UE, (e.g., UE 115, 115-a, 115-b, or apparatus 1002, 1002'). At 802, the UE receives a pre-grant assignment from an eNB. For example, the UE may receive the pre-grant assignment on a non-contention based carrier, such as PCC, or on a contention based carrier, such as an SCC. The pre-grant may comprise a target subframe in, e.g., a contention based carrier. In one example, the contention based carrier may comprise an SCC.

At 804, the UE performs a CCA/eCCA operation based on the pre-grant assignment. The UE determines whether the CCA/eCCA check is passed at 806.

Once the UE passes the CCA/eCCA operation, the UE transmits a preamble at 808 based on the pre-grant assignment. The preamble may be transmitted, e.g., on a contention based carrier, such as an SCC. For example, when a UE receives a pre-grant for a target subframe in an SCC, the UE may perform a CCA/eCCA check for that SCC and may transmit a preamble on that SCC. The preamble may be transmitted prior to the target subframe on the SCC. The preamble may comprise an initial portion to identify the UE to a base station, e.g., eNB, that issued the pre-grant. A second portion of the preamble may be configured for band occupation, as described in connection with FIG. 7. The pre-grant may indicate timing information and frequency information for the transmission of the preamble. The pre-grant may indicate how long the preamble transmission should be. This may provide a duration after which the UE should discontinue transmission if no response is received from the eNB.

The preamble may be transmitted via a fast control channel, e.g., in a different control channel like the PCC. The control channel may, e.g., be available frequently such as approximately every OFDM symbol and with a short duration such as approximately one OFDM symbol, a few sub-OFDM symbols, or even a sub-OFDM symbol length.

The UE may continue to transmit the preamble until it is otherwise indicated. For example, the UE may continue to transmit the preamble until it receives a grant confirmation response from the eNB. If no response is received from the eNB, the UE may continue to transmit the preamble until the end of a designated period, e.g., until a timer expires, until a boundary such as a resync is reached, etc.

An eNB may send a pre-grant transmission with assignments for the same target subframe to multiple UEs. Thus, the preamble may uniquely identify the UE among the group of multiple UEs that received a pre-grant assignment for the same resource.

The UE may receive a grant confirmation from the eNB in response to the transmission of the preamble. At 810, the UE determines whether a grant confirmation has been received from the eNB. As the eNB may have transmitted pre-grants to multiple UEs for the same target resource, e.g. subframe, the grant confirmation may comprise any of a grant confirmation of the same target subframe in the pre-grant assignment, a modification of the pre-grant assignment, or an indication to discontinue transmission. Thus, once the eNB determines the UEs that pass the CCA/eCCA check the eNB may instruct the UE to avoid collision by indicating that at least one UE should cease transmission. The grant confirmation may be a modification of the pre-grant assignment, e.g., based on a more accurate understanding of the eNB provided by the preambles. For example, the pre-grant assignments might be modified in the grant confirmation in order to accommodate transmissions from multiple UEs. The grant confirmation may be received, e.g., on a non-contention based carrier such as a PCC, or on a contention based carrier, such as an SCC.

At 812, the UE transmits data or ceases transmission according to the grant confirmation. If a grant confirmation is not received at 810, the UE determines at 814 whether the designated period has passed. If the period has not passed, the UE continues to transmit the preamble at 808. If the period has passed, the UE cases to transmit the preamble. The designated period may be based on a time period received from the eNB in the pre-grant.

Figure 9:
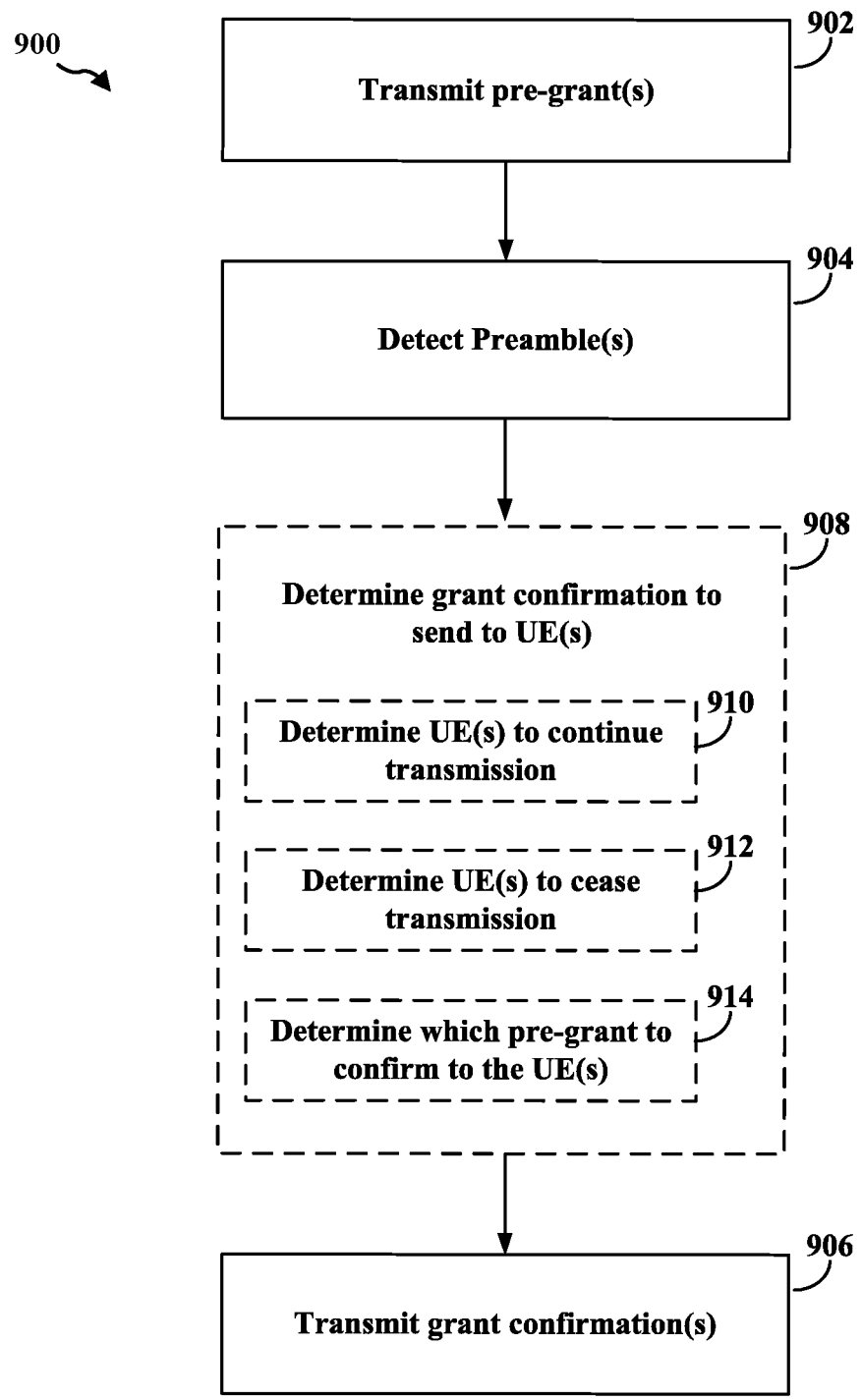
FIG. 9 is a flow chart of a method of wireless communication in accordance with various aspects of the present disclosure.

FIG. 9 is a flow chart 900 of a method of wireless communication. The method may be performed by an eNB, (e.g., eNB 105, 105-a, 105-b or the apparatus 1202, 1202'). At 902, the eNB transmits a pre-grant assignment to at least one UE. The pre-grant assignment may be transmitted on a non-contention based carrier, such as a PCC. The pre-grant may also be transmitted on a contention based carrier, such as an SCC.

At 904, the eNB detects a preamble transmission from at least one UE in response to the pre-grant assignment(s). The preamble may be received on a contention-based carrier, such as an SCC. The preamble waveform may be designed to allow for low complexity detection at the eNB. For example, each UE may transmit a different cyclic shift of a pseudo-random sequence and the eNB may perform correlation. Receiving the preamble from the UE indicates that the UE passed a CCA/eCCA check. As the eNB might send pre-grants to multiple UEs for the same target resource, the preamble may uniquely identify one of the UEs among those to which a pre-grant was transmitted. The eNB may use at least a portion of the preamble to determine the UE among those to which a pre-grant for the same target subframe was sent.

For example, the eNB may use an initial portion of the preamble to identify the UE. The remainder of the preamble may be less useful to the eNB and may be configured instead to hold the channel or to transmit a WiFi preamble. Thus, the eNB may disregard the remainder of the preamble after decoding the initial portion of the preamble that identifies the UE. A preamble may include additional information that is considered by the eNB, such as a buffer size. The eNB may use the transmission preamble to perform a channel estimation in order to improve the MCS computational accuracy before sending a grant confirmation to the UE At 906, the eNB transmits a grant confirmation to the UE. The grant confirmation may be transmitted on a non-contention based carrier, such as a PCC, or on a contention based carrier, such as the SCC. The grant confirmation may comprise a signal/control channel assignment for at least one of the UEs whose preambles were detected at 904.

The eNB may over-schedule by sending pre-grant assignments to multiple UEs for the same target resource. Thus, at 902, the transmission of the one or more pre-grant assignments may include transmitting a plurality of pre-grant assignments to a plurality of UEs with assignments for the same resource. Thus, the eNB may transmit one or more pre-grant assignments to a set of UEs, on the PCC or the SCC.

At 904, the detection of the one or more preamble transmissions may include detecting a plurality of preamble transmissions in response to the transmitted pre-grant assignments, each preamble uniquely identifying one of the UEs scheduled on the same uplink resource, e.g., subframe.

At 908, the eNB may determine a modification of the pre-grant assignments for UEs for which a preamble transmission is detected. This may include determining at least one UE to receive a grant confirmation indicating that the UE should continue transmission at 910 and determining other UEs for which preambles were received that should receive an indication to stop transmission at 912. When multiple preambles are received at the eNB, the UE that is selected for continued transmission may be selected using fairness criterion. The eNB may use the received preambles to perform another channel estimation in order to improve the MCS computation accuracy as a part of determining a modification of the pre-grant assignments for the UEs for which a preamble is detected.

The eNB may also transmit multiple pre-grants to a single UE at 902, each pre-grant assigning a different resource to the UE. In response to the pre-grants, the UE performs multiple CCA/eCCA checks and transmits preambles to the eNB in response to each pre-grant for which the CCA/eCCA is successful. Thus, determining a grant confirmation to send to the UE at 908 may include determining which pre-grant to confirm to the UE at 914.

The eNB may transmit multiple pre-grants to multiple UEs at 902, with overlapping or non-overlapping resources. After detecting any preambles from the UEs, the eNB may determine the grant confirmation to transmit the UEs. The grant confirmation may select one of the pre-grants or may modify a pre-grant assignment.

Thus, the grant confirmation(s) transmitted by the eNB at 906 may comprise any of a grant confirmation of the pre-grant assignment, a modification of the pre-grant assignment, or an indication to discontinue transmission. Thus, the grant confirmation may comprise a modified signal/control channel assignment from the pre-grant assignment for at least one of the UEs whose preambles were detected at 904.

Figure 10:
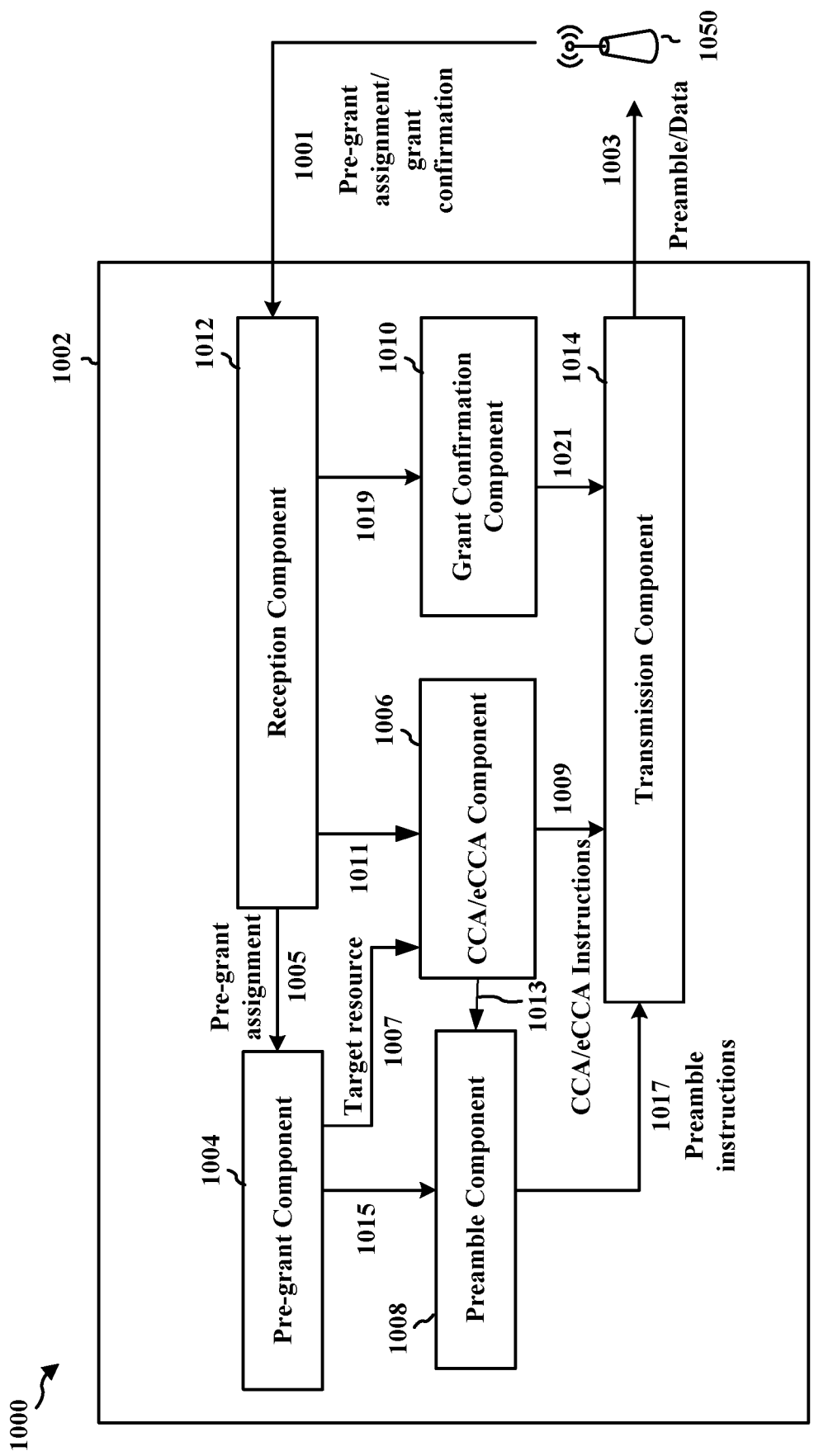
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE that receives transmissions 1001 from an eNB 1050 and that sends transmissions 1003 to eNB 1050. The apparatus includes a reception component 1012 that receives transmissions 1001 from the eNB 1050 and communicates the transmission to other components of apparatus 1002. For example, when a pre-grant assignment is received at the reception component 1012, the reception component 1012 may output the pre-grant assignment 1005 to the pre-grant component 1004. The pre-grant component 1004 may process the pre-grant in order to determine a target resource for data transmission that is pre-assigned to the apparatus. The target resource may be on a contention-based carrier, such as an SCC. Thus, the pre-grant component 1004 may provide this information 1007 to a CCA/eCCA component 1006 that is configured to perform a CCA/eCCA operation based on the pre-grant assignment. The CCA/eCCA component 1006 then outputs instructions 1009 for the transmission component 1014 to perform a CCA/eCCA. The CCA/eCCA component may determine that a CCA/eCCA operation succeeds, e.g., based on CCA/eCCA transmissions 1011 received from the eNB at reception component 1012 and output to the CCA/eCCA component 1006. The CCA component 1006 may then output an indication 1013 to the preamble component 1008 that the CCA/eCCA operation was successful. Using information 1015 output from the pre-grant component 1004 to the preamble component 1008, the preamble component 1008 outputs instructions 1017 to the transmission component 1014 for transmitting a preamble based on the pre-grant assignment when the CCA operation succeeds. The preamble may be used by the eNB in order to send a grant confirmation for resources for the uplink data transmission from the apparatus 1002. Thus, the reception component 1012 may receive a grant confirmation in response to the preamble transmission and may output information 1019 for the grant confirmation to a grant confirmation component 1010. The grant confirmation component 1010 may output instructions 1021 to transmission component 1014 for data transmission at a resource identified in the grant confirmation. The grant confirmation component also may instruct the transmission component to cease transmission based on the grant confirmation.

The apparatus may include additional components that perform each of the blocks of the algorithm in the aforementioned flow charts of FIG. 8. As such, each block in the aforementioned flow charts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
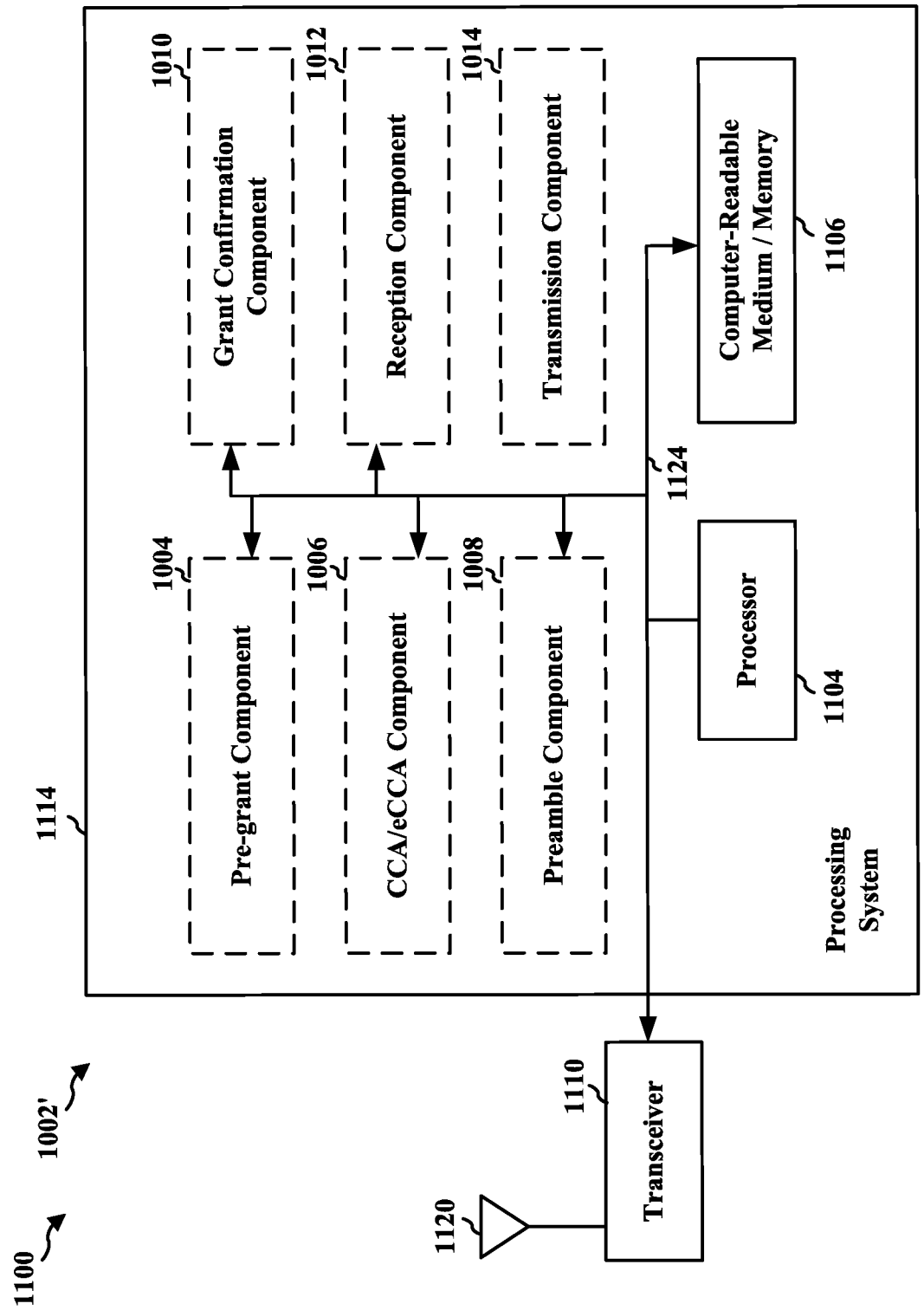
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1012. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the components 1004, 1006, 1008, 1010, 1012, and 1014. The components may be software components running in the processor 1104, resident/stored in the computer readable medium/memory 1106, one or more hardware components coupled to the processor 1104, or some combination thereof. The processing system 1114 may be a component of the UE 115, 115-a, 115-b, or 1002 and may include the memory 682 and/or at least one of the TX processor 664, the RX processor 658, and the controller/processor 680.

In one configuration, the apparatus 1002/1002' for wireless communication includes means for means for receiving a pre-grant assignment at a UE, such as reception component 1004 and/or reception component 1012, means for performing a clear channel assessment (CCA) operation based on the pre-grant assignment, such as CCA/eCCA component 1006, and means for transmitting a preamble based on the pre-grant assignment when the CCA operation succeeds, the preamble uniquely identifying the UE, such as preamble component 1008 and/or transmission component 1014. The apparatus 1002/1002' may further include means for receiving a grant confirmation in response to the preamble transmission, such as grant confirmation component 1010 and/or reception component 1012. The grant confirmation may include any of a grant confirmation of the pre-grant assignment, a modification of the pre-grant assignment, and an indication to discontinue transmission. At least one of the pre-grant assignment or the grant confirmation may be received on a primary component carrier (PCC) and the preamble may be transmitted on a secondary component carrier (SCC). For example, the pre-grant may identify a target subframe in the SCC. The means for transmitting the preamble may be configured to transmit the preamble in the SCC identified in the pre-grant assignment. Once a grant confirmation is received the apparatus may be configured to transmit data or to stop transmission based on the information in the grant confirmation. Thus, the apparatus 1002/1002' may include means for transmitting data in response to a grant confirmation that confirms a target resource for data transmission. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Figure 12:
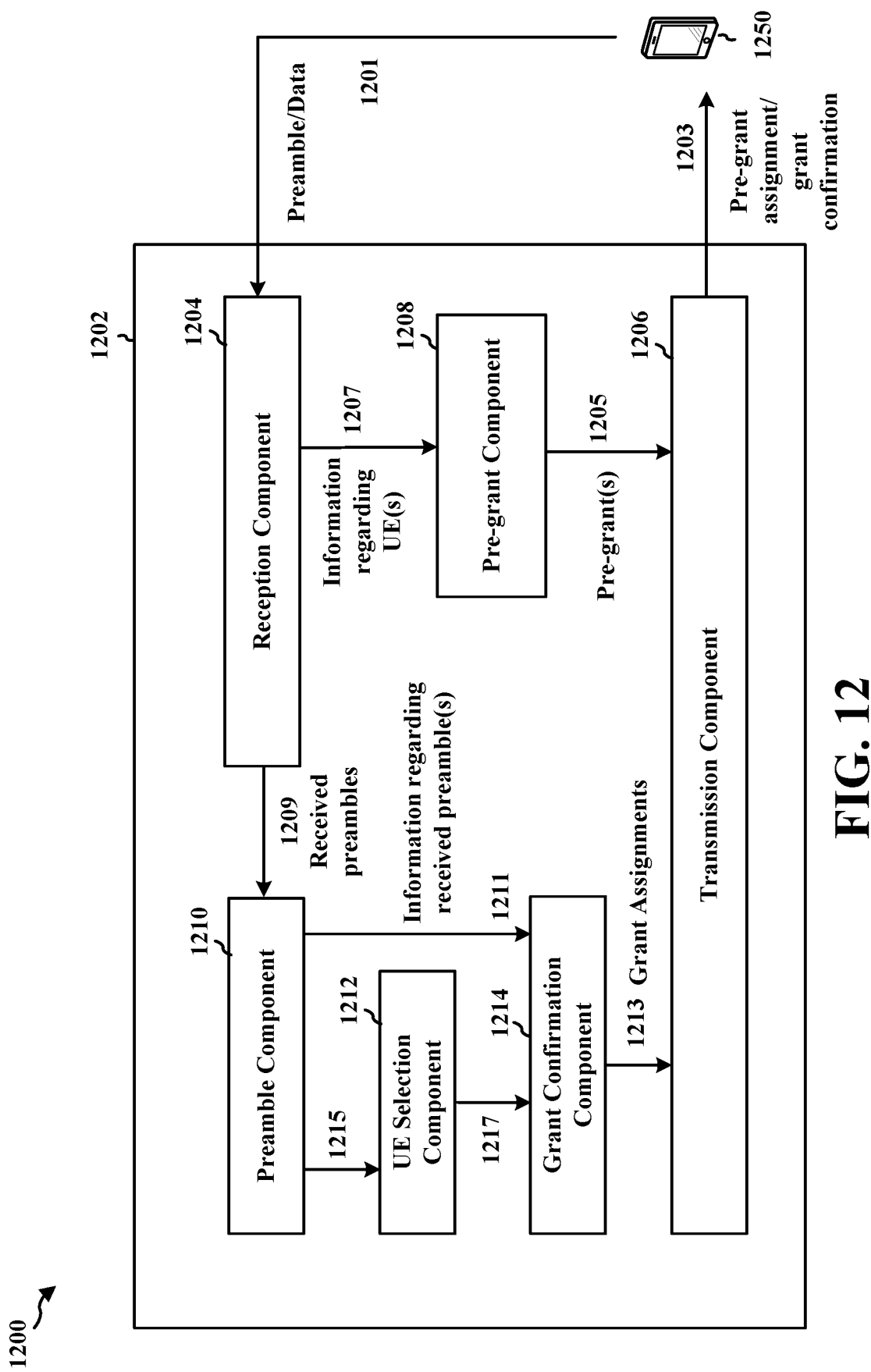
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be an eNB. The apparatus may includes a reception component 1204 that receives transmissions 1201 from UEs, e.g., UE 1250, and a transmission component 1206 that sends transmissions 1203 to UEs, e.g., UE 1250. Using instructions 1205 output to the transmission component 1206 from a pre-grant component 1208, the transmission component 1206 may transmit one or more pre-grant assignments to a set of UEs, the set including one or more UE, e.g., UE 1250. The pre-grant assignment may be transmitted on a non-contention carrier, such as a PCC, or on a contention based carrier such as an SCC. The pre-grant component may determine pre-grant(s) at least in part using information 1207 output from reception component 1204. For example, the pre-grants may be determined using CQI reports from each UE that will be periodically or aperiodically reported, and/or an SR report from each UE that indicates the UL buffer size of the UE.

When preamble transmissions are received from the UE, the reception component outputs information 1209 from the received preamble to preamble component that detects one or more preamble transmissions in response to the one or more pre-grant transmissions. The preamble may be received on a contention based carrier, such as an SCC. Based on output 1211 regarding the received preamble, the grant confirmation component 1214 outputs instructions 1213 for the transmission component 1206 to transmit one or more grant confirmation assignments to the UE(s) of the set of UEs. The grant confirmation may be transmitted on a non-contention carrier, such as the PCC, or on a contention based carrier such as the SCC. The grant confirmation may be a modification of the pre-grant assignment At times, the apparatus may transmit a plurality of pre-grant assignments to a plurality of UEs with assignments for the same resource. The apparatus may transmit a plurality of pre-grants for different resources to a single UE. Thus, a plurality of preamble transmissions may be detected by the apparatus in response to the transmitted pre-grant assignments, each preamble uniquely identifying one of the UEs to which a pre-grant was sent and/or uniquely identifying the pre-grant to which the preamble corresponds.

Thus, a UE selection component may determine a modification of the pre-grant assignments for UEs for which a preamble transmission is detected. This may include determining at least one UE to receive a grant confirmation indicating that the UE should continue transmission and determining other UEs for which preambles were received that should receive an indication to stop transmission. Thus, the preamble component 1210 may output information 1215 regarding the received preambles to UE selection component 1212. After determining the UE(s) that will continue to transmit data and the UE(s) that will be instructed to cease transmission, the UE selection component 1212 may output information 1217 on the determined UEs to the grant confirmation component 1214 so that the grant confirmation component 1214 can generate the appropriate grant confirmation(s). Based on the grant confirmation, the eNB may thereafter receive a data transmission from the UE(s).

The apparatus may include additional components that perform each of the blocks of the algorithm in the aforementioned flow charts of FIG. 9. As such, each block in the aforementioned flow charts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
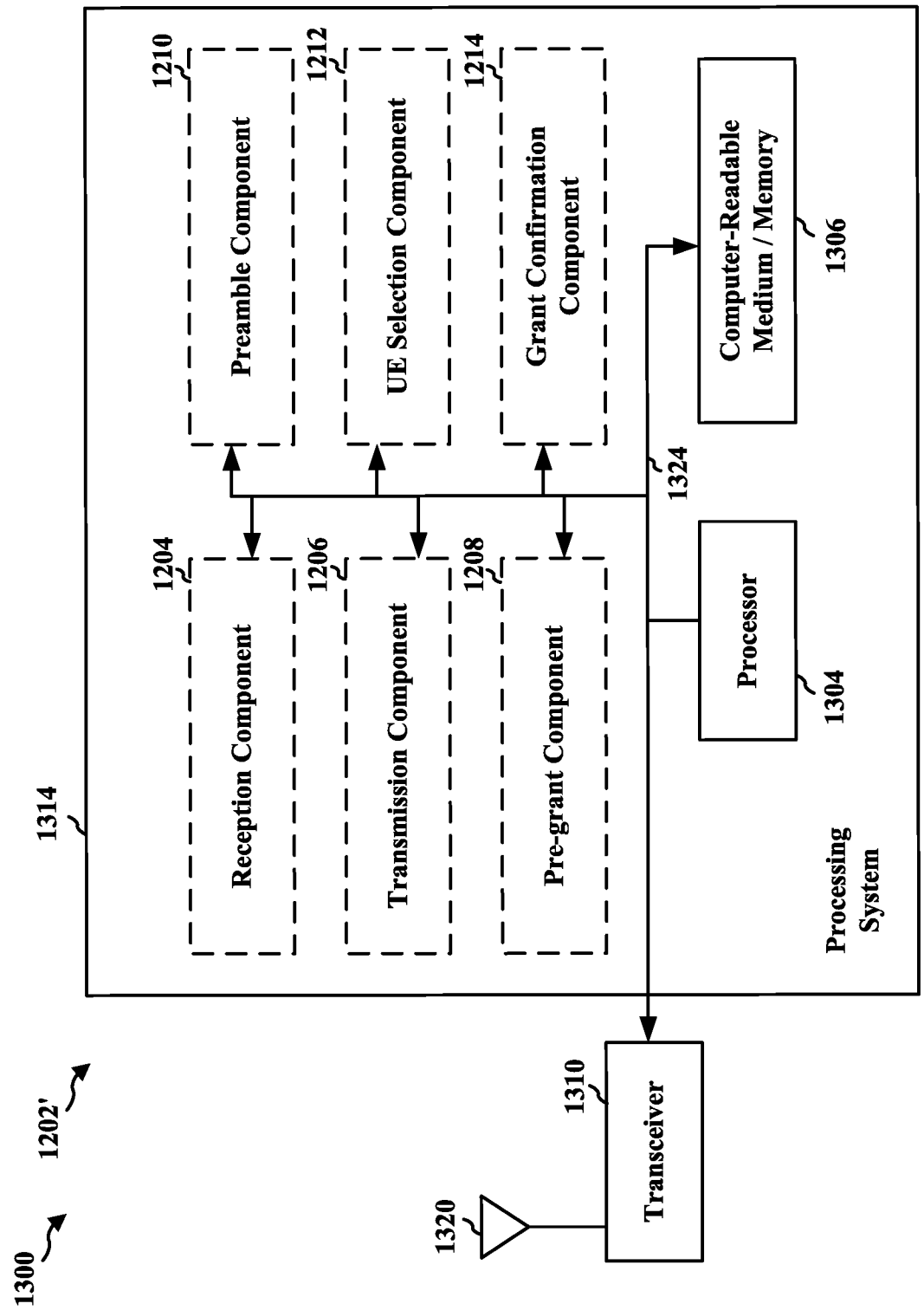
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1204, 1206, 1208, 1210, 1212, and 1214. The components may be software components running in the processor 1304, resident/stored in the computer readable medium/memory 1306, one or more hardware components coupled to the processor 1304, or some combination thereof. The processing system 1314 may be a component of the eNB 105, 105-a, 105-b, 1050, or 1202 and may include the memory 642 and/or at least one of the TX processor 620, the RX processor 638, and the controller/processor 640.

In one configuration, the apparatus 1202/1202' for wireless communication includes means for transmitting one or more pre-grant assignments to a set of UEs, the set including one or more UE, e.g., pre-grant component 1208 and/or transmission component 1206, means for detecting one or more preamble transmissions on a contention based carrier in response to the one or more pre-grant transmission, e.g., reception component 1204 and/or preamble component 1210, means for transmitting one or more grant confirmation assignments, e.g., grant confirmation component 1214 and/or transmission component 1206. The apparatus 1202/1202' may overschedule a resource by sending multiple pre-grants to different UEs for the same target resource. Thus, the means for transmitting the one or more pre-grant assignments may be configured to transmit a plurality of pre-grant assignments to a plurality of UEs with assignments for the same resource. Similarly, the means for detecting the one or more preamble transmissions may be configured to detect a plurality of preamble transmissions in response to the transmitted pre-grant assignments, each preamble uniquely identifying one of the UEs. The apparatus 1202/1202' may further include means for determining a modification of the pre-grant assignments for UEs for which a preamble transmission is detected. In one example this may include UE selection component 1212. The means for determining a modification of the pre-grant assignments being configured to determine at least one UE to receive a grant confirmation indicating that the UE should continue transmission and to determine other UEs for which preambles were received that should receive an indication to stop transmission. The apparatus may further include means for receiving a data transmission from a UE based on the grant confirmation sent to the UE. Such means may include, e.g., reception component 1204. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and components in FIGS. 8, 10A, 10B, and 12 may comprise processors, electronics devices, hardware devices, electronics components, logical circuits, memories, software codes, firmware codes, etc., or any combination thereof.

Those of skill would further appreciate that the various illustrative logical blocks, components, circuits, and algorithm steps described in connection with the disclosure herein may be implemented as electronic hardware, computer software, or combinations of both. To clearly illustrate this interchangeability of hardware and software, various illustrative components, blocks, components, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, components, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software component executed by a processor, or in a combination of the two. A software component may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a User Equipment (UE), comprising:
    receiving, at the UE, a pre-grant assignment directed to the UE having uplink data for transmission, wherein the pre-grant assignment indicates first resources assigned to the UE by a base station for the UE to transmit a preamble on a contention-based secondary component carrier (SCC), and wherein the pre-grant assignment indicates first resources that are UE specific for the UE to transmit the preamble on the contention-based SCC;
    performing a clear channel assessment (CCA) operation on the contention-based SCC based on the pre-grant assignment;
    transmitting a preamble on the contention-based SCC based on the pre-grant assignment when the CCA operation succeeds, the preamble uniquely identifying the UE;
    receiving a grant confirmation in response to the preamble transmission, wherein the grant confirmation corresponds to data transmission and wherein the grant confirmation is signaled to the UE separately from the pre-grant assignment; and
    transmitting or refraining from transmitting the uplink data according to the grant confirmation received from the base station.

2. The method of claim 1, wherein the grant confirmation comprises at least one of:
    a grant confirmation of the pre-grant assignment;
    a modification of the pre-grant assignment; or
    an indication to discontinue transmission.

3. The method of claim 1, wherein the preamble is transmitted on a contention based carrier,
    wherein the pre-grant assignment comprises a target subframe in the contention-based SCC, and
    wherein the UE transmits the preamble in the contention-based SCC identified in the pre-grant assignment.

4. The method of claim 1, wherein the preamble comprises an initial portion to identify the UE to a base station that issued the pre-grant assignment and a second portion for band occupation.

5. The method of claim 1, wherein at least one of the pre-grant assignment or the grant confirmation is received on a primary component carrier (PCC).

6. The method of claim 1, wherein the grant confirmation indicates second resources assigned to the UE for the data transmission, and wherein the UE transmits the data transmission based on the second resources assigned to the UE in the grant confirmation.

7. The method of claim 4, wherein a remaining portion of the preamble comprises a WiFi preamble.

8. A user equipment (UE), comprising:
    means for receiving, at the UE, a pre-grant assignment directed to the UE having uplink data for transmission, wherein the pre-grant assignment indicates first resources assigned to the UE by a base station for the UE to transmit a preamble on a contention-based secondary component carrier (SCC), and wherein the pre-grant assignment indicates first resources that are UE specific for the UE to transmit the preamble on the contention-based SCC;
    means for performing a clear channel assessment (CCA) operation on the contention-based SCC based on the pre-grant assignment;
    means for transmitting a preamble on the contention-based SCC based on the pre-grant assignment when the CCA operation succeeds, the preamble uniquely identifying the UE;
    means for receiving a grant confirmation in response to the preamble transmission, wherein the grant confirmation corresponds to data transmission and wherein the grant confirmation is signaled to the UE separately from the pre-grant assignment; and means for transmitting or refraining from transmitting the uplink data according to the grant confirmation received from the base station.

9. The UE of claim 8, wherein the grant confirmation comprises at least one of:
a grant confirmation of the pre-grant assignment;
a modification of the pre-grant assignment; or
an indication to discontinue transmission.

10. The UE of claim 8, wherein the pre-grant assignment comprises a target subframe in the contention-based SCC, and wherein the means for transmitting the preamble is configured to transmit the preamble in the contention-based SCC identified in the pre-grant assignment.

11. The UE of claim 8, wherein at least one of the pre-grant assignment or the grant confirmation is received on a primary component carrier (PCC).

12. A user equipment (UE), comprising:
a memory; and
at least one processor coupled to the memory and configured to:
receive, at the UE, a pre-grant assignment directed to the UE having uplink data for transmission, wherein the pre-grant assignment indicates first resources assigned to the UE by a base station for the UE to transmit a preamble on a contention-based secondary component carrier (SCC), and wherein the pre-grant assignment indicates first resources that are UE specific for the UE to transmit the preamble on the contention-based SCC:
perform a clear channel assessment (CCA) operation on the contention-based SCC based on the pre-grant assignment;
transmit a preamble on the contention-based SCC based on the pre-grant assignment when the CCA operation succeeds, the preamble uniquely identifying the UE;
receive a grant confirmation in response to the preamble transmission, wherein the grant confirmation corresponds to data transmission and wherein the grant confirmation is signaled to the UE separately from the pre-grant assignment; and
transmit or refraining from transmitting the uplink data according to the grant confirmation received from the base station.

13. The UE of claim 12, wherein the grant confirmation comprises at least one of:
a grant confirmation of the pre-grant assignment;
a modification of the pre-grant assignment; or
an indication to discontinue transmission.

14. The UE of claim 12, wherein the pre-grant assignment comprises a target subframe in the contention-based SCC, and
wherein the at least one processor is configured to transmit the preamble in the contention-based SCC identified in the pre-grant assignment.

15. The UE of claim 12, wherein at least one of the pre-grant assignment or the grant confirmation is received on a primary component carrier (PCC).

16. A non-transitory computer-readable medium storing computer executable code for wireless communication, comprising code to:
receive, at the UE, a pre-grant assignment directed to the UE having uplink data for transmission, wherein the pre-grant assignment indicates first resources assigned to the UE by a base station for the UE to transmit a preamble on a contention-based secondary component carrier (SCC), and wherein the pre-grant assignment indicates first resources that are UE specific for the UE to transmit the preamble on the contention-based SCC;
perform a clear channel assessment (CCA) operation on the contention-based SCC based on the pre-grant assignment;
transmit a preamble on the contention-based SCC based on the pre-grant assignment when the CCA operation succeeds, the preamble uniquely identifying the UE;
receive a grant confirmation in response to the preamble transmission, wherein the grant confirmation corresponds to data transmission and wherein the grant confirmation is signaled to the UE separately from the pre-grant assignment; and
transmit or refraining from transmitting the uplink data according to the grant confirmation received from the base station.

17. The non-transitory computer-readable medium of claim 16, wherein the grant confirmation comprises at least one of:
a grant confirmation of the pre-grant assignment;
a modification of the pre-grant assignment; or
an indication to discontinue transmission.

18. The non-transitory computer-readable medium of claim 16, wherein the pre-grant assignment comprises a target subframe in the contention-based SCC and the preamble is transmitted in the contention-based SCC identified in the pre-grant assignment.

19. The non-transitory computer-readable medium of claim 16, wherein at least one of the pre-grant assignment or the grant confirmation is received on a primary component carrier (PCC).

20. A method of wireless communication, comprising:
transmitting one or more pre-grant assignments each pre-grant assignment being UE specific and directed to a user equipment (UE) having uplink data for transmission from among a set of UEs, the set including one or more UE, wherein each pre-grant assignment indicates resources assigned to the corresponding UE to transmit a preamble on a contention-based secondary component carrier (SCC);
detecting one or more preamble transmissions on a contention based carrier in response to the transmission of the one or more pre-grant assignments; and
transmitting one or more grant confirmation assignments in response to the detected one or more preamble transmissions, wherein each grant confirmation assignment corresponds to uplink data transmission from the corresponding UE, and wherein each grant confirmation is signaled to the corresponding UE separately from the pre-grant assignment for the corresponding UE.

21. The method of claim 20,
wherein transmitting the one or more pre-grant assignments includes transmitting a plurality of pre-grant assignments to a plurality of UEs with assignments for the same resource;
wherein detecting the one or more preamble transmissions includes detecting a plurality of preamble transmissions in response to the transmitted pre-grant assignments, each preamble uniquely identifying one of the UEs, and further comprising:
determining a modification of the pre-grant assignments for UEs for which a preamble transmission is detected.

22. The method of claim 21, wherein determining the modification of the pre-grant assignments includes determining at least one UE to receive a grant confirmation indicating that the UE should continue transmission; and determining other UEs for which preambles were received that should receive an indication to stop transmission.

23. The method of claim 20, wherein at least one of the one or more pre-grant assignments or the one or more grant confirmation assignments is transmitted on a primary component carrier (PCC).

24. The method of claim 22, wherein the grant confirmation comprises a modification of the pre-grant assignment.

25. A base station, comprising:

means for transmitting one or more pre-grant assignments each pre-grant assignment being UE specific and directed to a user equipment (UE) having uplink data for transmission from among a set of UEs, the set including one or more UE, wherein each pre-grant assignment indicates resources assigned to the corresponding UE to transmit a preamble on a contention-base secondary component carrier (SCC);

means for detecting one or more preamble transmissions on a contention based carrier in response to the transmission of the one or more pre-grant assignments; and means for transmitting one or more grant confirmation assignments in response to the detected one or more preamble transmissions, wherein each grant confirmation assignment corresponds to uplink data transmission from the corresponding UE, and wherein each grant confirmation is signaled to the corresponding UE separately from the pre-grant assignment for the corresponding UE.

26. The base station of claim 25, wherein the means for transmitting the one or more pre-grant assignments is configured to transmit a plurality of pre-grant assignments to a plurality of UEs with assignments for the same resource;

wherein the means for detecting the one or more preamble transmissions is configured to detect a plurality of preamble transmissions in response to the transmitted pre-grant assignments, each preamble uniquely identifying one of the UEs, and the apparatus further comprising:

means for determining a modification of the pre-grant assignments for UEs for which a preamble transmission is detected, the means for determining a modification of the pre-grant assignments being configured to:

determine at least one UE to receive a grant confirmation indicating that the UE should continue transmission; and determine other UEs for which preambles were received that should receive an indication to stop transmission.

27. The base station of claim 25, wherein at least one of the one or more pre-grant assignments or the one or more grant confirmation assignments is transmitted on a primary component carrier (PCC).

28. A base station, comprising:

a memory; and at least one processor coupled to the memory and configured to:

transmit one or more pre-grant assignments each pre-grant assignment being UE specific and directed to a user equipment (UE) having uplink data for transmission from among a set of UEs, the set including one or more UE, wherein each pre-grant assignment indicates resources assigned to the corresponding UE to transmit a preamble on a contention-based secondary component carrier (SCC);

detect one or more preamble transmissions on a contention based carrier in response to the transmission of the one or more pre-grant assignments; and transmit one or more grant confirmation assignments in response to the detected one or more preamble transmissions, wherein each grant confirmation assignment corresponds to uplink data transmission from the corresponding UE, and wherein each grant confirmation is signaled to the corresponding UE separately from the pre-grant assignment for the corresponding UE.

29. The base station of claim 28, wherein the at least one processor is further configured to:

transmit a plurality of pre-grant assignments to a plurality of UEs with assignments for the same resource and to detect a plurality of preamble transmissions in response to the transmitted pre-grant assignments, each preamble uniquely identifying one of the UEs; and determine a modification of the pre-grant assignments for UEs for which a preamble transmission is detected, wherein determining a modification of the pre-grant assignments includes:

determining at least one UE to receive a grant confirmation indicating that the UE should continue transmission; and determining other UEs for which preambles were received that should receive an indication to stop transmission.

30. The base station of claim 28, wherein at least one of the one or more pre-grant assignments or the one or more grant confirmation assignments is transmitted on a primary component carrier (PCC).

31. A non-transitory computer-readable medium storing computer executable code, comprising code to:

transmit one or more pre-grant assignments each pre-grant assignment being UE specific and directed to a user equipment (UE) having uplink data for transmission from among a set of UEs, the set including one or more UE, wherein each pre-grant assignment indicates resources assigned to the corresponding UE to transmit a preamble on a contention-based secondary component carrier (SCC);

detect one or more preamble transmissions on a contention based carrier in response to the transmission of the one or more pre-grant assignments; and transmit one or more grant confirmation assignments in response to the detected one or more preamble transmissions, wherein each grant confirmation assignment corresponds to uplink data transmission from the corresponding UE, and wherein each grant confirmation is signaled to the corresponding UE separately from the pre-grant assignment for the corresponding UE.

32. The non-transitory computer-readable medium of claim 31, further comprising code to:

transmit a plurality of pre-grant assignments to a plurality of UEs with assignments for the same resource;

detect a plurality of preamble transmissions in response to the transmitted pre-grant assignments, each preamble uniquely identifying one of the UEs; and determine a modification of the pre-grant assignments for UEs for which a preamble transmission is detected, wherein determining a modification of the pre-grant assignments includes:

determine at least one UE to receive a grant confirmation indicating that the UE should continue transmission; and determine other UEs for which preambles were received that should receive an indication to stop transmission.

33. The non-transitory computer-readable medium of claim 31, wherein at least one of the one or more pre-grant assignments or the one or more grant confirmation assignments is transmitted on a primary component carrier (PCC).

* * * * *